May 15, 1923.
V. J. SHALEK
1,455,673
DENTAL FLOSS DISPENSER
Filed Jan. 12, 1922
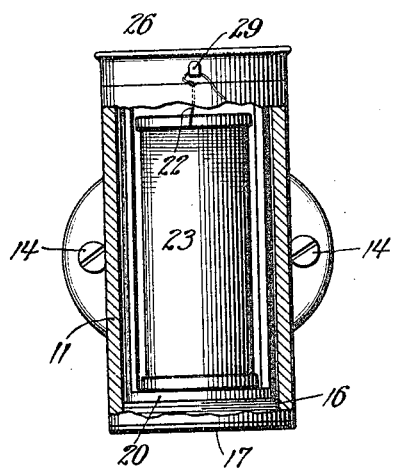
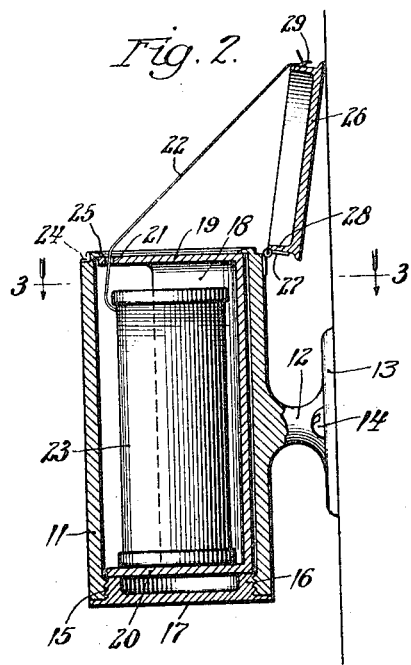
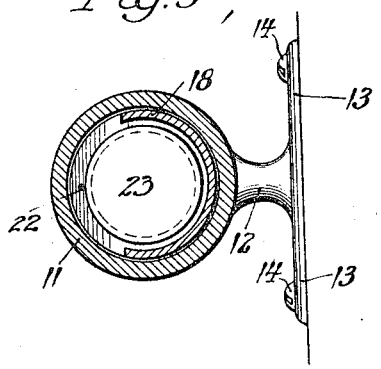
Inventor,
Victor J. Shalek.
By William Bradbury
McCalb & Pierce   Atty.

Patented May 15, 1923.

1,455,673

UNITED STATES PATENT OFFICE.

VICTOR J. SHALEK, OF OAK PARK, ILLINOIS.

DENTAL FLOSS DISPENSER.

Application filed January 12, 1922. Serial No. 528,660.

*To all whom it may concern:*

Be it known that I, VICTOR J. SHALEK, a citizen of the United States, and resident of Oak Park, in the county of Cook and State of Illinois, have invented a certain new and useful Improvement in Dental Floss Dispensers, of which the following is a full, clear, concise, and exact description, reference being had to the accompanying drawings, forming a part of this specification.

This invention relates to a container or receptacle for holding and dispensing dental floss or similar matter. The object of the invention is the provision of a container which may be secured to the wall of a toilet adjacent the washbowl, or any other desired place, and which will protect the floss from dust and handling, yet will permit a desired length of the floss to be readily removed from the container.

One of the features of the invention is the arrangement of the outer casing of the container in substantially the form of a cylinder with a removable bottom to permit the insertion of a spool of floss, and a bracket member for attaching the container to the wall.

Another feature of the invention is the provision of an inner spool receptacle or shell which is slidable into the outer casing and may be maintained therein by a removable end of the outer case.

Still another feature of the invention is the arrangement by which the end of the inner receptacle forms a closure for one end of the outer casing of the container.

Another feature of the invention is the arrangement of the cover, which, when in its closed position, acts to protect the floss from dust and handling, but, when moved to its open position, withdraws from the container a length of floss sufficient to be readily grasped by the user.

A still further feature, and one related to the one last noted, is the provision on the hinged cover of a holding and severing clip for the floss, which acts to facilitate the breaking off of the desired length of floss, and also operates to withdraw a portion of the floss from the container when the cover is lifted.

Other features and advantages will appear from time to time as the description of the invention progresses.

In the drawings:

Figure 1 is a front elevation of the device with a part of the container broken away to show the inner spool receptacle or shell and the spool of floss therein;

Figure 2 is a vertical sectional view through the middle of the device at right angles to Fig. 1, and showing the cover in its open position;

Figure 3 is a sectional view on substantially the line 3—3 of Fig. 2, looking in the direction of the arrows.

Referring now to the drawings, 11 is the outer shell of the container which is substantially cylindrical and is provided on one side thereof with the bracket member 12 having the oppositely extending ears 13 for the reception of screws 14 by means of which the container may be secured to the wall or other desired object. The cylindrical shell 11 is provided at its lower end with the screw-threaded portion 15 within which may be secured the screw-threaded flange 16 of the end cap 17.

The inner spool receptacle or shell consists of a substantially semi-cylindrical portion 18 provided with the circular end portions 19 and 20. The end portion 19 is provided with an opening 21, through which the floss 22 from the spool 23 may be drawn. The outer shell 11 of the container, at its upper end, is shouldered, as shown at 24, and has the inwardly extending flange 25 against which the end 19 of the inner shell is arranged to engage, thus closing the upper end of the container.

The cover 26 is secured to the shell 11 at a point above the bracket member 12 by means of the hinge 27, one leaf of which is secured to the member 11, the other being secured to the flange 28 of the cover in any desired manner. Secured to the outer side of the flange 28 at a point substantially diametrically opposite the hinge 27 is the upwardly and outwardly extending clip 29.

When it is desired to insert a spool of floss in the container, the end member 17 is removed and the inner receptacle 18 is withdrawn. The spool of floss is then inserted in the inner receptacle, the end of the floss being extended through the opening 21 in the end 19. The inner receptacle with the spool therein is then inserted from below into the outer shell 11 and the end member 17 screwed in place.

In using the device, the cover will be raised, withdrawing a portion of the floss 22 from the container, as shown in Fig. 2. The user will then grasp the exposed section of the floss and remove the end from the clip 29 on the cover 26. After withdrawing the desired length of floss from the container, the cover 26 will be closed and the floss passed over the clip 29, when a slight downward jerk on the floss will cause it to be severed or broken adjacent to the clip. The clip, however, will still operate to retain the end of the floss which is projecting from the opening 21 and when the cover is next raised, in the operation of obtaining a length of floss, another length of floss will be again withdrawn from the container, as shown in Fig. 2, and the process may be repeated.

It is seen that by the present arrangement, the floss within the receptacle is at all times protected from dust and from handling and maintained in a sanitary condition, and that in using the floss, the user has access only to the section of the floss which he or she desires to use, the remaining portion of the floss being fully protected from dirt and handling by the cover of the receptacle.

While but a specific embodiment of the invention is disclosed, it is to be understood that many modifications are contemplated, and the invention is to be limited only by the scope of the appended claims.

What I claim is:

1. In a dental floss dispenser, a container adapted to hold a spool of dental floss, a cover, means pivotally joining said cover to one edge of said container, a clip adapted to hold a strand of floss secured to said cover, at a point substantially diametrically opposite the pivot means, and means for guiding the floss from said container at a point also substantially diametrically opposite the pivot means.

2. In a dental floss dispenser, a container adapted to hold a spool of dental floss, a cover for said container, means pivotally securing said cover to said container at one edge thereof, a clip adapted to assist in breaking a thread of floss and to hold the end thereof secured to said cover at a point remote from said pivot means, and means adapted to guide the floss from said container at a point remote from the pivot means.

3. In a dental floss dispenser, a substantially cylindrical member adapted to hold a spool of floss, a closure for one end of said member, a cover pivotally secured to the opposite end thereof, a clip secured to said cover, and means for guiding the floss from said cylindrical member at a point diametrically opposite the pivot means.

4. In a dental floss dispenser, a substantially cylindrical member adapted to hold a spool of floss, a closure arranged for screw-threaded engagement with one end of said member, a cover member, means pivotally securing said cover to the opposite end of said member, a floss clip on said cover adjacent to the edge thereof and diametrically opposite said pivot means, and means for guiding the floss from said cylindrical member at a point diametrically opposite the pivot means.

5. In a dental floss dispenser, a container adapted to hold a quantity of floss, a cover for one end of said container, pivot means whereby said cover is adapted for movement relative to the container about an axis at right angles to the axis of the container, a clip carried by the cover and located at a point substantially opposite the pivot means, and means carried by the container for guiding the floss therefrom at a point also substantially opposite the aforesaid pivot means.

6. In a dental floss dispenser, a receptacle, an inner shell adapted to receive a spool of floss slidable within said receptacle, a closure for one end of said receptacle, and an end for said shell arranged to substantially close the other end of said receptacle.

7. In a dental floss dispenser, a substantially cylindrical receptacle, a substantially semi-cylindrical inner shell adapted to receive a spool of floss slidable within said receptacle, a closure for one end of said receptacle, and an end for said shell arranged to substantially close the other end of said receptacle.

8. In a dental floss dispenser, a receptacle, an inner shell adapted to receive a spool of floss slidable within said receptacle, a closure for one end of said receptacle, and circular ends for said shell, one of said ends being arranged to substantially close the end of said receptacle remote from said closure.

9. In a dental floss dispenser, a substantially cylindrical receptacle, an inner shell adapted to receive a spool of floss slidable within said receptacle, a closure for one end of said receptacle, and an end for said shell arranged to substantially close the other end of said receptacle and having an opening therein for the passage of a strand of floss.

10. In a dental floss dispenser, a substantially cylindrical receptacle, a substantially semi-cylindrical inner shell adapted to receive a spool of floss slidable within said receptacle, a closure arranged for screw-threaded engagement with one end of said receptacle, and circular ends for said shell, one of said ends being arranged to substantially close the end of said receptacle remote from said closure and having an opening therein for the passage of a strand of floss.

11. In a dental floss dispenser, a receptacle, an inner shell adapted to receive a spool of floss slidable within said receptacle, an end for said shell arranged to substantially close one end of said receptacle and having an opening therein for the passage of a strand of floss, a cover pivotally joined to the adjacent end of said receptacle and arranged, when in closed position, to overlie the end of said shell, and a clip adapted to hold a strand of floss secured to said cover.

12. In a dental floss dispenser, a substantially cylindrical receptacle, a substantially semi-cylindrical inner shell adapted to receive a spool of floss slidable within said receptacle, a substantially circular end for said shell arranged to close one end of said receptacle and having an opening therein for the passage of a strand of floss, a cover for the adjacent end of said receptacle, means pivotally securing said cover to said receptacle at one side thereof, and a clip adapted to hold a strand of floss on said cover at a point remote from said pivotal means.

In witness whereof, I hereunto subscribe my name this 4th day of January, 1922.

VICTOR J. SHALEK.

Witnesses:
EDNA V. GUSTAFSON,
J. DAVID DICKINSON.